United States Patent
Koga et al.

(10) Patent No.: US 7,810,780 B2
(45) Date of Patent: Oct. 12, 2010

(54) DRIVE MECHANISM FOR POWER SEAT APPARATUS FOR VEHICLE

(75) Inventors: Yoshitaka Koga, Chiryu (JP); Hirokazu Suzumura, Aichi-gun (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 446 days.

(21) Appl. No.: 12/057,454

(22) Filed: Mar. 28, 2008

(65) Prior Publication Data

US 2008/0238167 A1    Oct. 2, 2008

(30) Foreign Application Priority Data

Mar. 29, 2007    (JP)    ............... 2007-089837

(51) Int. Cl.
*F16M 13/00*    (2006.01)

(52) U.S. Cl. ...................... 248/430; 248/419

(58) Field of Classification Search ............... 248/430, 248/429, 424, 416, 419, 420, 393; 297/346, 297/341, 318, 322, 329; 384/18, 19, 50, 384/34

See application file for complete search history.

(56) References Cited

U.S. PATENT DOCUMENTS

| 5,176,353 A * | 1/1993 | Aihara et al. ............... 248/430 |
| 7,325,851 B2 | 2/2008 | Ito et al. |
| 2003/0168566 A1 | 9/2003 | Ito et al. |
| 2004/0108436 A1 | 6/2004 | Hofschulte et al. |
| 2005/0126333 A1 | 6/2005 | Dohles et al. |
| 2007/0096494 A1 | 5/2007 | Hofschulte et al. |
| 2007/0108360 A1 | 5/2007 | Ito et al. |

FOREIGN PATENT DOCUMENTS

| DE | 202 20 866 U1 | 7/2004 |
| JP | 9-142181 | 6/1997 |
| JP | 9-207632 | 8/1997 |
| JP | 11-208322 | 8/1999 |
| JP | 2000-85419 | 3/2000 |
| JP | 2006-290131 | 10/2006 |
| WO | WO 02/070299 A1 | 9/2002 |

OTHER PUBLICATIONS

U.S. Appl. No. 12/052,179, filed Mar. 20, 2008, Yoshitaka Koga, et al.
U.S. Appl. No. 12/732,621, filed Mar. 26, 2010, Koga et al.

* cited by examiner

*Primary Examiner*—Lori L Lyjak
(74) *Attorney, Agent, or Firm*—Oblon, Spivak, McClelland, Maier & Neustadt, L.L.P.

(57) ABSTRACT

According to an aspect of the present invention, a drive mechanism for a power seat apparatus for a vehicle includes an electric motor, a speed-reduction gear mechanism, a gear housing for housing therein the speed-reduction gear mechanism and supporting thereto the electric motor, the gear housing including a housing body having an accommodating space, a cover mounted to the housing body, and a retaining member provided on the housing body for fixedly retaining the cover on the housing body by rotating the cover relative to the housing body upon assembly, and a bracket through which the gear housing is supported by the driven member, the bracket including a receiving portion and a rotation-restricting surface.

4 Claims, 3 Drawing Sheets

DRIVE MECHANISM FOR POWER SEAT APPARATUS FOR VEHICLE

CROSS REFERENCE TO RELATED APPLICATIONS

This application is based on and claims priority under 35 U.S.C. §119 to Japanese Patent Application 2007-089837, filed on Mar. 29, 2007, the entire content of which is incorporated herein by reference.

FIELD OF THE INVENTION

This invention generally relates to a drive mechanism for a power seat apparatus for a vehicle.

BACKGROUND

A known power seat apparatus for a vehicle disclosed in JP2000-85419A includes a pair of lower rails fixedly mounted on a vehicle floor on a left side and a right side respectively, and a pair of upper rails slidably supported by the pair of lower rails and supporting thereon a vehicle seat.

Each of the lower rails is provided with a nut member securely retaining therethrough the lower rail. Each of the upper rails is provided with a screw shaft rotatably supported and extending in a longitudinal direction of a vehicle, and with a drive mechanism for driving the screw shaft. The screw shafts are threadably engaged with the nut members. When the drive mechanism drives the screw shafts to rotate, the screw shafts change positions thereof relative to the nut members, thereby moving in the longitudinal direction. As a result, the upper rails supporting the screw shafts slide relative to the lower rails in the longitudinal direction, and thus a position of the vehicle seat, supported by the upper rails, is adjusted in the longitudinal direction.

The drive mechanism of the known power seat apparatus for the vehicle includes a motor and speed-reduction portions for reducing rotation speed of the motor and changing rotating directions of rotation axes. The speed-reduction portions are fixedly mounted to the upper rails disposed on the left side and the right side respectively, and the motor is coupled to either one of the speed-reduction portions. An output power of the motor is directly transmitted to an input gear of the speed-reduction portion to which the motor is coupled. To an input gear of the other speed-reduction portion, the output power is transmitted via a transmission shaft extending in a lateral direction of the vehicle. Each of the screw shafts is coupled to the output gear of the speed-reduction portion on the left side and the right side respectively by penetrating through the output gear respectively, and thus the output gears rotate the screw shafts.

In the speed-reduction portion of the above-mentioned drive mechanism, a worm including a rotation axis in the lateral direction serves as an input gear and is housed in an accommodating space formed in a housing. A worm wheel including a rotation axis in the longitudinal direction serves as an output gear and is housed in the accommodating space so as to mesh with the worm. The screw shaft is fixedly fitted in the output gear. In order to restrict the worm wheel from moving in an axial direction thereof, the accommodating space includes a stepped hole where the worm wheel is accommodated. That is, one of bearing portions each protrudingly provided on one of the end surfaces of the worm wheel is fitted into a bearing hole of the stepped hole, and thus the one of the end surfaces of the worm wheel contacts with a stepped portion of the stepped hole. The other one of the bearing portions is fitted into a bearing hole formed on the gear box cover, and thus the other one of the end surfaces of the worm wheel contacts with an end surface of the gear box cover. In this state, the gear box cover is fastened to the housing by means of screws.

According to the drive mechanism of the known power seat apparatus for the vehicle disclosed in JP2000-185419A, the gear box cover needs to be fastened to the housing by using plural screws in order to rotatably support the worm wheel serving as the output gear while restricting the worm wheel from moving in the axial direction thereof. Tightening plural screws requires time and effort, and an increased number of parts to be assembled, thereby increasing assembly complication and costs.

A need thus exists for a drive mechanism for a power seat apparatus for a vehicle, which is not susceptible to the drawback mentioned above.

SUMMARY OF THE INVENTION

According to an aspect of the present invention, a drive mechanism for a power seat apparatus for a vehicle includes an electric motor for driving a driven member, a speed-reduction gear mechanism provided between the electric motor and the driven member for reducing rotation speed of the electric motor and transmitting the reduced rotation speed to the driven member, a gear housing supported by the driven member and housing therein the speed-reduction gear mechanism, the gear housing supporting thereto the electric motor, and the gear housing including a housing body having an accommodating space accommodating therein the speed-reduction gear mechanism, a cover mounted to the housing body for covering the accommodating space, and a retaining member provided on the housing body for fixedly retaining the cover on the housing body by rotating the cover relative to the housing body upon assembly, and a bracket through which the gear housing is supported by the driven member, the bracket including a receiving portion for fixedly receiving the gear housing thereto and a rotation-restricting surface for restricting rotation of the cover relative to the housing body under a condition of the gear housing being fixed to the bracket.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
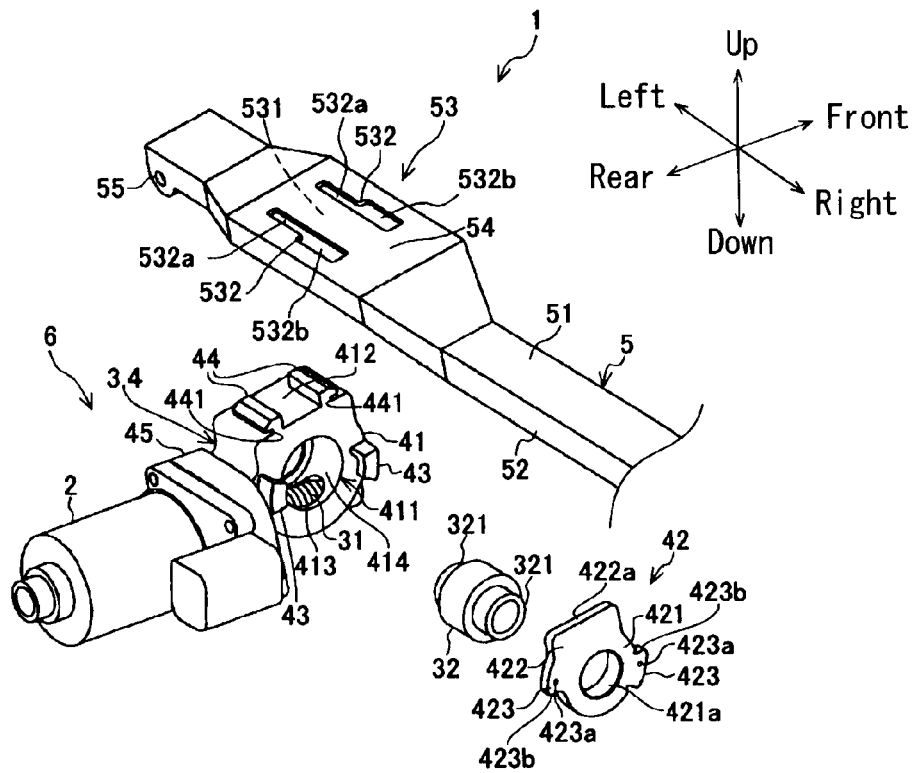
FIG. 1 is an exploded perspective view of a construction of a drive mechanism according to an embodiment.

A drive mechanism for a power seat apparatus for a vehicle according to an embodiment of this invention is applied to, for example, a seat slide apparatus, a seat reclining apparatus or a seat lifting apparatus each including a drive source therein and provided on a front seat of an automobile and the like.

Described below is an embodiment of the drive mechanism for the power seat apparatus for the vehicle according to the present invention. The drive mechanism is used for the seat slide apparatus adapted to be mounted on the front seat of, for example, the automobile. Directional terms "longitudinal (i.e., front and back), lateral (i.e., left and right) and vertical (i.e., up and down)", as used throughout this specification, refer to directions relative to the vehicle on which the power seat apparatus according to the embodiment is mounted.

A drive mechanism 1 of the power seat apparatus for the vehicle (hereinafter referred to as a drive mechanism 1) includes an electric motor 2, a speed-reduction gear mechanism 3, a gear housing 4 and a bracket 5.

The electric motor 2 is coupled to the speed-reduction gear mechanism 3 which is described in detail below, and drives the power seat apparatus for the vehicle.

The speed-reduction gear mechanism 3 includes a worm 31 and a worm wheel 32. The worm 31, having a cylindrical shape and including a rotation axis extending in a longitudinal direction, is directly coupled to an output shaft of the electric motor 2. The worm wheel 32, having a cylindrical shape and including a rotation axis extending in a lateral direction, defines a diameter larger than that of the worm 31. The worm wheel 32 includes a first bearing portion 321 protruding in an axial direction thereof from a first end surface facing the housing body 41 and a second bearing portion 321 protruding in the axial direction thereof from a second end surface facing a cover 42. The worm wheel 32 serves as an output gear of the speed-reduction gear mechanism 3 by meshing with the worm 31. Rotation speed of the electric motor 2 is reduced by the speed-reduction gear mechanism 3 in accordance with a predetermined reduction gear ratio of the worm 31 and the worm wheel 32.

The gear housing 4 includes a housing body 41 and the cover 42. The housing body 41 is formed with an accommodating space 411 for accommodating the speed-reduction gear mechanism 3 therein and includes a contacting surface 412 in an upper portion thereof for contacting with the bracket 5 which is described in detail below. The accommodating space 411 includes a worm bearing hole 413 having a longitudinal axis and rotatably housing the worm 31 therein, and a stepped hole 414 having a lateral axis and housing the worm wheel 32 therein, an inner surface of the stepped hole 414 includes a stepped profile. The stepped hole 414 is formed with a bearing hole 414a on the left side into which the first bearing portion 321 is fitted. When the bearing hole 414a accommodates the worm wheel 32 inserted into the stepped hole 414 from a right side, the first end surface, on which the first bearing portion 321 is formed, of the worm wheel 32 comes in contact with a stepped portion 414b so that the worm wheel 32 is restricted from moving leftward. The stepped hole 414 is in addition formed with a large diameter hole 414c on the right side, into which a bearing portion 421 of the cover 42 which is described in detail below is fitted.

The cover 42 is made of a plate member and is formed with the bearing portion 421 in a lower region thereof, the bearing portion 421 having a cylindrical shape. The cover 42 also includes a rotation-restricted portion 422 protruding upwardly from the bearing portion 421, the rotation-restricted portion 422 having a rectangular shape and including a rotation-restricted surface 422a formed on a top end surface thereof so that the rotation-restricted surface 422a makes a flat surface. On an outer periphery of the bearing portion 421, two retained members 423, 423 are provided to protrude in a radial direction of the bearing portion 421. The bearing portion 421 is formed with a bearing hole 421a in a center thereof, into which the second bearing portion 321 of the worm wheel 32 is fitted.

Each of the retained members 423, 423 includes each of protrusions 423a, 423a provided on a front side of the cover 42 (i.e., a surface on the right side). The protrusions 423a, 423a increase thickness of portions of the retained members 423, 423 where the protrusions 423a, 423a are formed, so that a slight resistance is generated when retaining members 43, 43 accommodate the retained members 423, 423 in place. Consequently, the retained members 423, 423 are less likely to become dislocated from the retaining members 43, 43 and thus the cover 42 is securely mounted to the housing body 41.

Each of the retaining members 43, 43 is provided on an end surface of the housing body 41 on which the large diameter hole 414c of the stepped hole 414 is provided, at each side of the large diameter hole 414c. Each of the retaining members 43, 43 is opened towards an inner periphery side of the large diameter hole 414c and towards one circumferential end, that is, a circumferential end from which a tip portion 423b of the retained member 423 of the cover 42 is received when assembling the cover 42 onto the housing body 41 (i.e., a circumferentially open end). Each of the retaining members 43, 43 is closed towards an outer periphery side of the large diameter hole 414c and towards the other circumferential side (i.e., a circumferentially closed end). Thus, each of the retaining members 43, 43 has an L-shaped vertical section profile when viewed without the end surface of the housing body 41 on which the large diameter hole 414c is provided, that is, a U-shaped vertical section profile when viewed with the end surface of the housing body 41 on which the large diameter hole 414c is provided. The cover 42 is mounted to the housing body 41 in a manner so that the tip portions 423b, 423b of the retained members 423, 423 are received from the circumferentially open ends of the retaining members 43, 43 respectively and the cover 42 is rotated relative to the housing body 41 until the tip portions 423b, 423b come in contact with the circumferentially closed ends respectively.

Each of the retaining members 43, 43 is provided with each of cavities 431, 431 into which each of the protrusions 423a, 423a of the retained members 423, 423 is fitted. The cavities 431, 431 are formed on an inner surface of the retaining members 43, 43, at positions which correspond to positions of the protrusions 423a, 423a when the retained members 423, 423 are accommodated by the retaining portions 43, 43. The cavities 431, 431 are of an appropriate depth to accommodate the protrusions 423a, 423a therein. In this way, by providing the cavities 431, 431 at the corresponding positions to the protrusions 423a, 423a, the protrusions 423a, 423a are fitted into the cavities 431, 431 respectively once the retained members 423, 423 are accommodated by the retaining members 43, 43, thereby preventing the cover 42 from readily rotating. Consequently, the cover 42 is retained on the housing body 41 more securely compared to when only the protrusions 423a, 423a are provided. In addition, a sound such as a click serves as an indicator to signal that the protrusions 423a, 423a are properly accommodated by the cavities 431, 431, thus confirming the cover 42 is securely mounted to the housing body 41, which improves a certainty of assembly.

Hook portions 44, 44 are protruding members provided on the contacting surface 412 formed on a top end surface of the housing body 41 so as to be arranged parallel to each other in the lateral direction. The hook portions 44, 44 include narrowed portions 441, 441 respectively that are formed at base portions thereof and extending in the lateral direction.

A motor-fixing portion 45 is provided at a rear portion of the housing body 41 and the electric motor 2 is fixedly mounted thereto. A motor-driven reduction gear apparatus 6 is constituted by mounting the cover 42 to the housing body 41 housing the speed-reduction gear mechanism 3 therein, and by mounting the electric motor 2 to the motor-fixing portion 45.

The bracket 5, positioned above a rotation transmission shaft and the motor-driven reduction gear apparatus 6, supports the motor-driven reduction gear apparatus 6 thereunder and is connected to driven members 92, 92 (i.e., a pair of upper rails 92, 92). The bracket 5 is provided between and across the driven members 92, 92 each arranged on the left side and the right side respectively, and includes a bracket base 51 and two side flanges 52, 52 provided on both longitudinal sides thereof, thus having a substantial, wide inverted U-shaped cross sectional profile. Further, the bracket 5 includes a receiving portion 53 engaging with the hook portions 44, 44 of the housing body 41 and a rotation-restricting surface 54 restricting the cover 42 from rotating in an assembled state.

The receiving portion 53 is positioned near a left end of the bracket 5, above the motor-driven reduction gear apparatus 6 and includes a contacted surface 531 and slit openings 532, 532. The contacted surface 531 is formed on an undersurface of the receiving portion 53 for contacting with the contacting surface 412 of the housing body 41.

The slit openings 532, 532 are formed on the receiving portion 53 of the bracket 5 so as to extend in the lateral direction and include small openings 532a, 532a and large openings 532b, 532b respectively. The small openings 532a, 532a are disposed in left side portions of the slit openings 532, 532 respectively so as to engage with the narrowed portions 441, 441 of the hook portions 44, 44 without longitudinal clearances therebetween. The large openings 532b, 532b, which are formed to be larger than the small openings 532a, 532a, are disposed in right side portions of the slit opening 532, 532 respectively to have a size allowing the hook portions 44, 44 to be inserted thereinto. The hook portions 44, 44 of the gear housing 4 housing the speed-reduction gear mechanism 3 are inserted into the large openings 532b, 532b of the slit openings 532, 532 respectively, and then slid in a direction of the small openings 532a, 532a, so that the motor-driven reduction gear apparatus 6 is mounted to the bracket 5. The large openings 532b, 532b are of a lateral length that allows the hook portions 44, 44 to be inserted thereinto, and the small openings 532a, 532a are of a lateral length that is substantially equal to a lateral length of the hook members 44, 44.

The rotation-restricting surface 54 is positioned adjacent to the receiving portion 53. Therefore the contacted surface 531 formed on the undersurface of the rotation-restricting surface 54 is positioned adjacent to the contacted surface 531 formed on the undersurface of the receiving portion 53 and above the rotation-restricted surface 422a of the rotation-restricted portion 422 of the cover 42. Since the contacted surface 531 of the rotation-restricting surface 54 is a continuous single surface with the contacted surface 531 of the receiving portion 53, an identical numeral is assigned for description.

The bracket 5 further includes fixing through-holes 55, 55 for mounting the bracket 5 to the upper rails 92, 92. The fixing through-holes 55, 55 are formed in the longitudinal direction on each of lateral end portions of the side flanges 52, 52.

Figure 2:
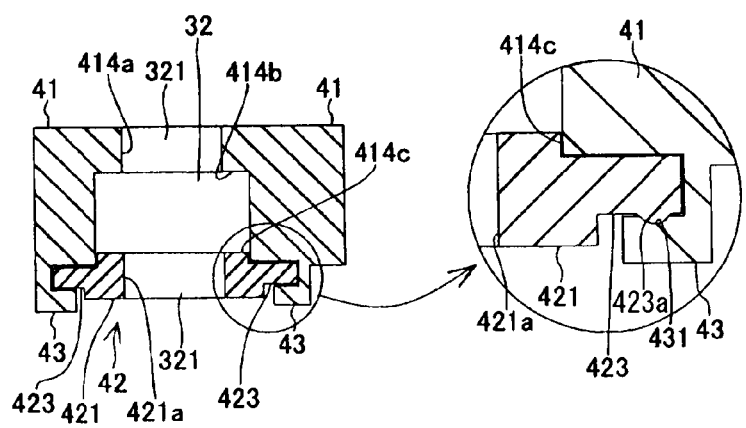
FIG. 2 is a perspective view of a construction of the drive mechanism according to the embodiment, illustrating a condition that a cover is retained on a housing.

For assembling the drive mechanism 1 of the embodiment, the worm wheel 32 is inserted into the stepped hole 414 of the accommodating space 411 formed on the housing body 41 from the right side, so that the first bearing portion 321 engages with the bearing hole 414a of the stepped hole 414 and the worm wheel 32 meshes with the worm 31 housed inside the worm bearing hole 413. Next, the second bearing portion 321 is fitted into the bearing hole 421a of the cover 42 and the bearing portion 421 of the cover 42 is fitted into the large diameter hole 414c of the stepped hole 414, then, the cover 42 is rotated counterclockwise relative to the housing body 41. At this time, each of the retained members 423, 423 of the cover 42 is received by each of the retaining members 43, 43 of the housing body 41 while the cover 42 is being rotated until each of the tip portions 423b, 423b of the retained members 423, 423 comes in contact with each of the circumferentially closed ends of the retaining members 43, 43. When the cover 42 is rotated to achieve the above-described state, each of the protrusions 423a, 423a of the retained members 423, 423 is fitted into each of the cavities 431, 431 formed on the inner surface of the retaining members 43, 43, thus making the click sound. Therefore, an operator knows by how much the cover 52 needs to be rotated. Consequently, as shown in FIG. 2, the second bearing portion 321 is fitted into the bearing hole 421a, the bearing portion 421 of the cover 42 is fitted into the large diameter hole 414c of the stepped hole 414, the cover 42 is retained on the housing body 41, and a second end surface of the worm wheel 32 (i.e., the opposite end surface to the end surface contacting with the stepped portion 414b of the stepped hole 414) comes in contact with a surface of a back side of the cover 42 (i.e., a surface on the left side). As a result, the worm wheel 32 is rotatably housed in the accommodating space 411 while being restricted from moving in an axial direction thereof.

Figure 3:
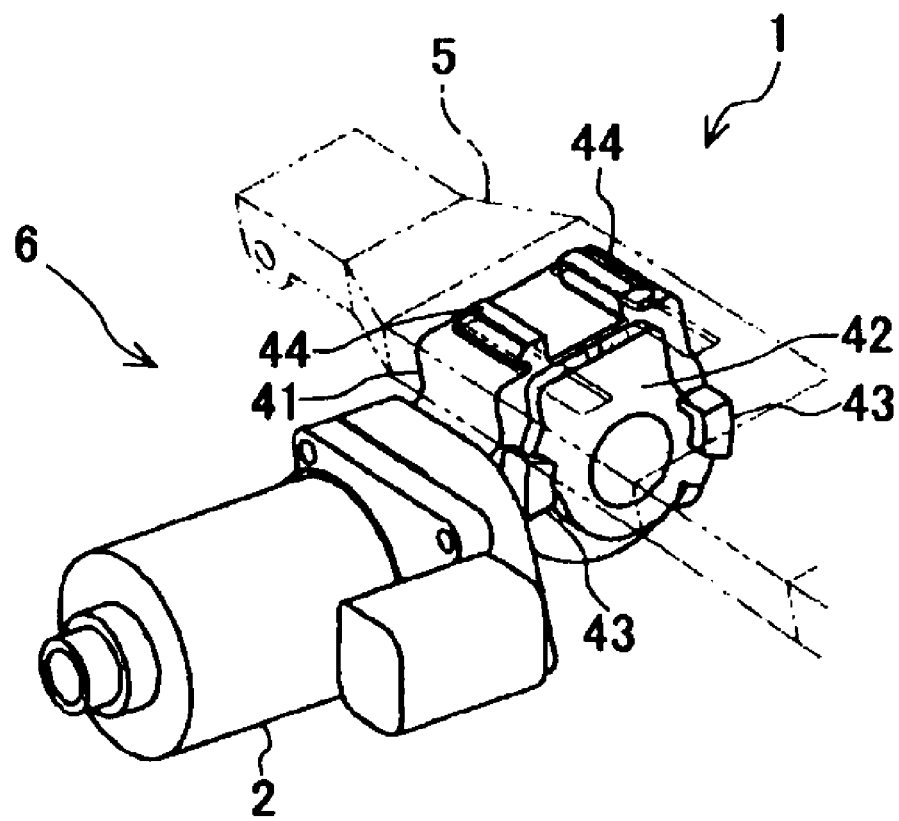
FIG. 3 is a local sectional view of the drive mechanism according to the embodiment.

Next, the bracket 5 is placed onto the motor-driven reduction gear apparatus 6, where the cover 42 is mounted to the housing body 41 and the electric motor 2 is fixedly mounted to the motor-fixing portion 45. The receiving portion 53 of the bracket 5 is aligned to the hook portions 44, 44 of the housing body 41. The hook portions 44, 44 are inserted into the large openings 532b, 532b of the receiving portion 53 so that the contacting surface 412 of the housing body 41 comes in contact with the contacted surface 531 of the receiving portion 53, and then the bracket 5 is slid in the lateral direction so that the hook portions 44, 44 engage with the small openings 532a, 532a of the receiving portion 53. In this way, the drive mechanism 1 of the embodiment is assembled as shown in FIG. 3. When the motor-driven reduction gear apparatus 6 is mounted to the bracket 5, the contacted surface 531 of the rotation-restricting surface 54 provided on the bracket 5 comes closer to the rotation-restricted surface 422a of the cover 42, thereby restricting the cover 42 from rotating, and thus the cover 42 is prevented from coming off the housing body 41.

Figure 4:
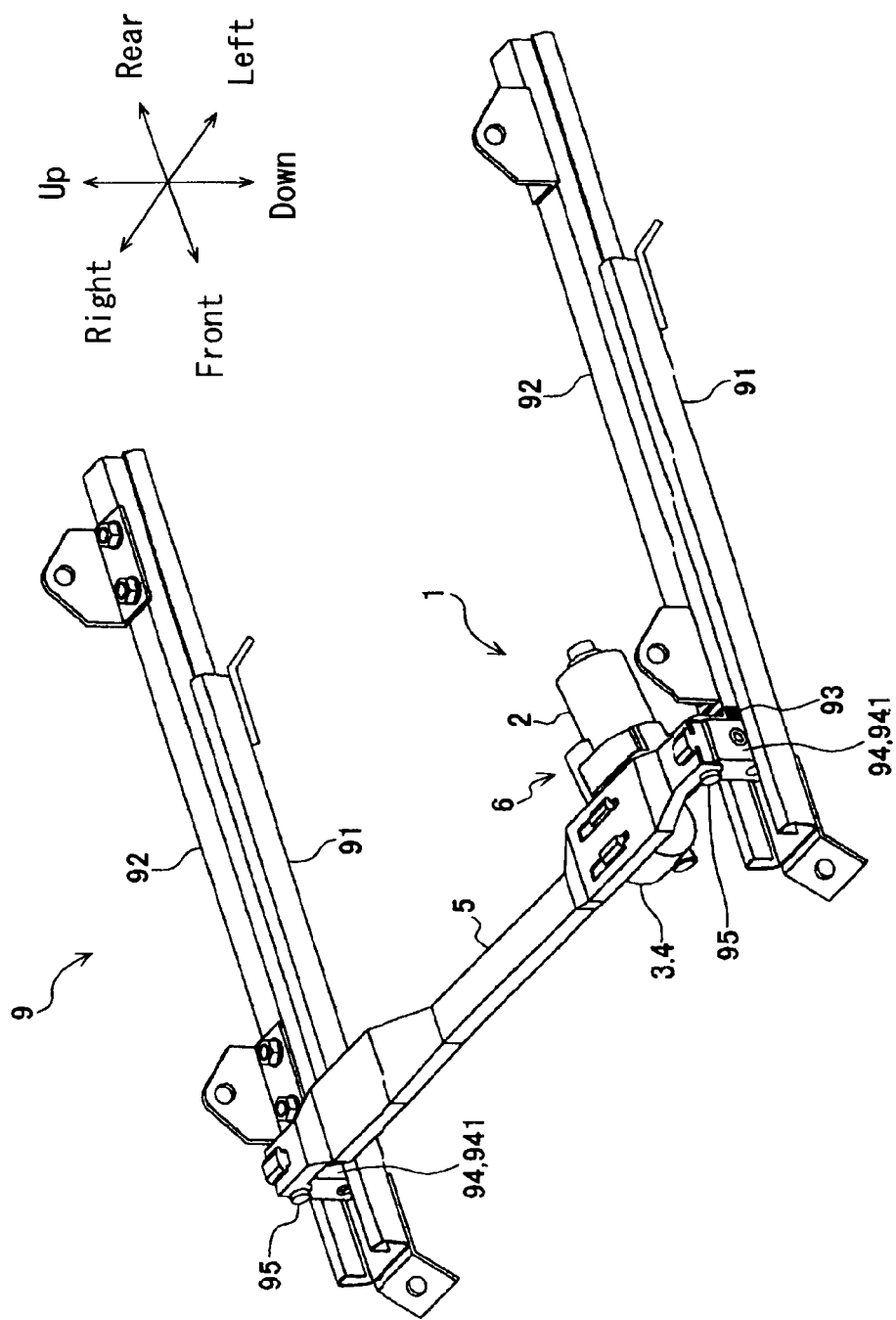
FIG. 4 is a view illustrating the construction of the drive mechanism according to the embodiment when applied to a power seat apparatus.

As shown in FIG. 4, the drive mechanism 1 according to the embodiment is used to longitudinally move a vehicle seat of a power seat apparatus 9.

The power seat apparatus 9 includes lower rails 91, 91, upper rails 92, 92 serving as the driven members, screw shafts 93, 93, nut members, direction changing gears 94, 94, the rotation transmission shaft and the drive mechanism 1 according to the embodiment.

The lower rails 91, 91 are a pair of elongated rails each fixedly mounted on a vehicle floor so as to be arranged on the left side and the right side respectively.

The upper rails 92, 92 are a pair of elongated rails supporting thereon the vehicle seat and fixed on the vehicle floor through the lower rails 91, 91 arranged on the left side and the right side respectively so as to slide in the longitudinal direction.

Each of the screw shafts 93, 93 is provided at each of the upper rails 92, 92 arranged on the left side and the right side respectively. The screw shafts 93, 93 are partly protruding from front ends of the upper rails 92, 92 and the rest thereof longitudinally extending inside the upper rails 92, 92. Each of the nut members is fixedly mounted on each of the lower rails 91, 91 arranged on the left side and the right side, and threaded around each of the screw shafts 93, 93 respectively.

Each of the direction changing gears 94, 94 is provided on the left side and the right side respectively, and employs helical gears as an input gear and an output gear. The input gear and the output gear are housed in a gear box 941 and rotatably supported so as to mesh with each other in a manner so that a rotation axis of the input gear and a rotation axis of the output gear run perpendicular to each other. The direction changing gears 94, 94 function as devices for converting a direction of a rotation axis of the rotation transmission shaft extending in the lateral direction into a direction of rotation axes of the screw shafts 93, 93 each extending in the longitudinal direction. Each of the input gears includes, in a center of rotation thereof, a hexagonal hole having a closed end. Each of the hexagonal holes of the input gears is fitted over each end of the rotation transmission shaft so that the input gears engage with the rotation transmission shaft in a rotational direction thereof and are restricted by the rotation transmission shaft in a width direction thereof (i.e., in the lateral direction). Front ends of the screw shafts are fixedly connected to the output gears respectively, so that the screw shafts are restricted from moving both in a rotational direction and in an axial direction thereof.

The motor-driven reduction gear apparatus 6 is mounted to the bracket 5 in the above-mentioned manner under a condition that the rotation transmission shaft is laterally fitted through the worm wheel 32 housed in the accommodating space 411 of the gear housing 4. By this, the rotation transmission shaft fitted through the worm wheel 32 rotates integrally with the worm wheel 32 and each end of the rotation transmission shaft is respectively connected to the input gears of the direction changing gears 94, 94.

Next, the fixing through-holes 55, 55 each formed in the longitudinal direction on the bracket 5 are matched with fixing through-holes each formed in the longitudinal direction on a front surface and a rear surface of an upper portion of the gear box 941, and with a fixing through-hole formed in the longitudinal direction on a front end portion the upper rail 92. Then, the bracket 5, the gear box 941 and the upper rail 92 are fastened together by means of a screw and a nut. The same procedure is applied for fastening the gear box 941 and the upper rail 92 disposed on the other lateral side of the bracket 5. In this way, the drive mechanism 1, the gear box 941 and the upper rail 92 are integrally and fixedly mounted to the bracket 5.

With the power seat apparatus 9 having the above-mentioned structure, the vehicle seat is slid in the longitudinal direction in a manner described below. First, the electric motor 2 is driven and the output shaft thereof is rotated, thereby rotating the worm 31 of the speed-reduction gear mechanism 3, the worm 31 being directly coupled to the output shaft of the electric motor 2. Next, the rotation of the worm 31 is transmitted to the worm wheel 32 meshing with the worm 31. At this time, the rotation speed of the output shaft of the electric motor 2 is reduced in accordance with the predetermined gear ratio of the worm 31 and the worm wheel 32. The rotation transmitted to the worm wheel 32 is then transmitted to the rotation transmission shaft fitted through the worm wheel 32, thereby rotating each of the input gears of the direction changing gears 94, 94 connected to the rotation transmission shaft. The rotations of the input gears are transmitted to the output gears whose rotation axes run perpendicular to those of the input gears, converting a direction of the rotation axis from the lateral direction to the longitudinal direction. Thus, the screw shafts 93, 93 directly coupled to the output gears are rotated. As the screw shafts 93, 93 rotate relative to the nut members, the screw shafts 93, 93 move in the longitudinal direction relative to the nut members fixedly mounted to the lower rails 91, 91. As a result, since the screw shafts 93, 93 are supported by the upper rails 92, 92, the upper rails 92, 92 slidably move relative to the lower rails 91, 91. Consequently, a position of the vehicle seat is longitudinally adjusted relative to the vehicle floor.

According to the embodiment, the speed-reduction gear mechanism 3 is housed in the housing body 41 of the gear housing 4, the housing body 41 including therein the accommodating space 411 covered by the cover 42. The cover 42 is retained on the housing body 41 by the retaining members 43, 43 provided on the housing body 41. Consequently, the cover 42 is securely retained on the housing body 41 by rotating the cover 42 relative to the housing body 41 so that the retaining members 43, 43 retain the retained members 423, 423. Then, once the motor-driven reduction gear apparatus 6 is fixedly mounted to the bracket 5 in order to mount the drive mechanism 1 to the upper rails 92, 92, the cover 42 is restricted from rotating relative to the housing body 41 by means of the rotation-restricting surface 54 provided on the bracket 5. As a result, the cover 42 is securely retained on the housing body 41, and thus the worm wheel 32 is rotatably supported by the gear housing 4 while being restricted from moving in the axial direction thereof.

Since the retaining members 43, 43 are provided on the housing body 41 and the bracket 5 is originally essential for mounting the drive mechanism 1 to the upper rails 92, 92, the cover 42 is securely retained on the housing body 41 by means only of the essential parts without using any fastening members such as screws, thereby reducing the number of parts. Further, by rotating the cover 42 relative to the housing body 41 so that the cover 42 is retained by the retaining members 43, 43, the cover 42 is easily assembled to the housing body 41.

Furthermore, since the retained members 423, 423 include the protrusions 423a, 423a respectively and the retaining members 43, 43 include the cavities 431, 431 respectively, the protrusions 423a, 423a are fitted into the cavities 431, 431 when the retaining members 43, 43 accommodate the retained members 423, 423. That is, the cover 42 is prevented from readily rotating after being assembled to the housing body 41 by allowing the retaining member to receive the cover. Therefore, the cover 42 does not come off the housing body 41 until the bracket 5 is fixed to the gear housing 4. Once the bracket 5 is fixed to the gear housing 4, the cover 42 is securely retained on the housing body 41 in a reliable manner.

Here, the drive mechanism for the power seat apparatus for the vehicle has been described according to the embodiment, however the present invention is not limited to the particular embodiment. For example, instead of providing the protrusion 423a on each of the retained members 423, 423, the protrusion 423a may be provided only on either one of the retained members 423, 423 or plural protrusions 423a, 423a may be provided on each of the retained members 423, 423. Furthermore, the protrusions 423a, 423a may be formed to protrude towards the housing body 41 or formed on an outer peripheral surface of the cover 42 to protrude circumferentially outwardly. Alternatively, the cavities 431, 431 may be formed on the cover 42 and the protrusions 423a, 423a may be formed on the retaining member 43, 43.

The drive mechanism 1 for the power seat apparatus for the vehicle according to the embodiment may be used as a drive mechanism for a seat lifting apparatus for changing a vertical height of the vehicle seat or for a seat reclining apparatus for changing an angle of a seat back of the vehicle seat. It is also possible to apply the retaining members and the retained members to a portion where an electric motor is coupled to a speed-reduction gear mechanism. For example, the retaining members may be provided on the motor-fixing portion of the gear housing of the speed-reduction gear mechanism and the retained members may be provided on the electric motor, and the electric motor is coupled to the motor-fixing portion by being rotated relative to the motor-fixing portion upon assembly. This eliminates fastening members such as screws and simplifies assembly procedures.

According to the embodiment of the present invention, either one of the retaining member 43 and the cover 42 includes thereon the protrusion 423*a* to be fitted into the cavity 431 formed on the other one of the retaining member 43 and the cover 42 when the cover 42 is retained on the housing body 41 by means of the retaining member 43.

According to the embodiment of the present invention, the driven member 92 includes the pair of upper rails 92, 92 supporting thereon the vehicle seat and slidably supported by the pair of lower rails 91, 91 adapted to be fixedly mounted on the vehicle floor on the left side and the right side respectively, and the bracket 5 connects the pair of upper rails 92, 92 arranged on the left side and the right side respectively.

According to the embodiment of the present invention, the bracket 5 connects the upper rails 92, 92 to form a drive unit for the power seat apparatus, and thus a manageability as the drive unit is improved, which facilitates an easy assembly.

According to the embodiment of the present invention, the drive mechanism for the power seat apparatus for the vehicle further includes the direction changing gear 94 attached to the bracket 5 and to the upper rail 92, and operatively connected to the speed-reduction gear mechanism 3.

According to the embodiment of the present invention, each of the direction changing gears 94, 94 is supported by the bracket 5 and by each of the upper rails 92, 92 to form the drive unit for the power seat apparatus, and thus the manageability as the drive unit is improved, which facilitates the easy assembly.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive mechanism for a power seat apparatus for a vehicle, comprising:
    an electric motor for driving a driven member;
    a speed-reduction gear mechanism provided between the electric motor and the driven member for reducing rotation speed of the electric motor and transmitting the reduced rotation speed to the driven member;
    a gear housing supported by the driven member and housing therein the speed-reduction gear mechanism, the gear housing supporting thereto the electric motor, and the gear housing including a housing body having an accommodating space accommodating therein the speed-reduction gear mechanism, a cover mounted to the housing body for covering the accommodating space, and a retaining member provided on the housing body for fixedly retaining the cover on the housing body by rotating the cover relative to the housing body upon assembly; and
    a bracket through which the gear housing is supported by the driven member, the bracket including a receiving portion for fixedly receiving the gear housing thereto and a rotation-restricting surface for restricting rotation of the cover relative to the housing body under a condition of the gear housing being fixed to the bracket.

2. The drive mechanism for the power seat apparatus for the vehicle according to claim 1, wherein either one of the retaining member and the cover includes thereon a protrusion to be fitted into a cavity formed on the other one of the retaining member and the cover when the cover is retained on the housing body by means of the retaining member.

3. The drive mechanism for the power seat apparatus for the vehicle according to claim 1, wherein the driven member includes a pair of upper rails supporting thereon a vehicle seat and slidably supported by a pair of lower rails adapted to be fixedly mounted on a vehicle floor on a left side and a right side respectively, and the bracket connects the pair of upper rails arranged on the left side and the right side respectively.

4. The drive mechanism for the power seat apparatus for the vehicle according to claim 3, further comprising:
    a direction changing gear supported to the bracket and to the upper rail, and operatively connected to the speed-reduction gear mechanism.

\* \* \* \* \*